US007733946B2

(12) United States Patent
Francon et al.

(10) Patent No.: US 7,733,946 B2
(45) Date of Patent: Jun. 8, 2010

(54) TERRESTRIAL REPEATER WITH REDISTRIBUTION OF PSEUDO-RANDOM CODES ON DIFFERENT CARRIER FREQUENCIES

(75) Inventors: Michel-Guy Francon, Toulouse (FR); Paul Vincent, Plaisance du Touch (FR); Nicolas Chuberre, Pibrac (FR)

(73) Assignee: Alcatel Lucent, Paris (FR)

( * ) Notice: Subject to any disclaimer, the term of this patent is extended or adjusted under 35 U.S.C. 154(b) by 717 days.

(21) Appl. No.: 11/570,590

(22) PCT Filed: Apr. 29, 2005

(86) PCT No.: PCT/FR2005/050289

§ 371 (c)(1),
(2), (4) Date: Feb. 13, 2007

(87) PCT Pub. No.: WO2006/000720

PCT Pub. Date: Jan. 5, 2006

(65) Prior Publication Data

US 2007/0183481 A1     Aug. 9, 2007

(30) Foreign Application Priority Data

Jun. 14, 2004    (FR)   .................. 04 51172

(51) Int. Cl.
*H04B 1/00*    (2006.01)
*H04L 25/20*   (2006.01)
(52) U.S. Cl. .................. 375/211; 375/141; 375/147
(58) Field of Classification Search ......... 375/140–142, 375/147, 148, 150, 211
See application file for complete search history.

(56) References Cited

U.S. PATENT DOCUMENTS

| 5,553,126 | A  | * | 9/1996  | Tang ........................ 370/342 |
| 6,459,725 | B1 | * | 10/2002 | Baker et al. ................ 375/214 |
| 6,728,005 | B1 |   | 4/2004  | Jia |
| 6,728,523 | B1 |   | 4/2004  | Yamashita |
| 2002/0111135 | A1 | * | 8/2002  | White et al. ............... 455/11.1 |

FOREIGN PATENT DOCUMENTS

WO    WO 03/065617 A1    8/2003

* cited by examiner

*Primary Examiner*—David B Lugo
(74) *Attorney, Agent, or Firm*—Fay Sharpe LLP

(57) ABSTRACT

This invention concerns a terrestrial repeater (RF) dedicated to a hybrid communication network comprising a satellite for transmitting to terminals (and at least to the repeater) signals (SPI) in the form of a first modulated carrier with data to be transmitted, encoded by suing initial sequences of at least two pseudo-random codes, and spectrally spread with spreading codes each associated with a sequence. The repeater comprises: i) first processing means (MRP, MTB) for dispreading and demodulating the received signals so as to retrieve the encoded data which they represent for decoding them, and ii) second processing means (MTPi, APi) for re-encoding the retrieved data with one first part of the codes of the corresponding sequence to constitute first encoded data, and with at least a second part of the codes of the corresponding sequence, at least complementary to the first part, to constitute at least second encoded data, and to generate to the terminals, first signals (SP"), in the form of the first modulated carrier with the first encoded data and spectrally spread, at lest second signals (SP2) in the form of at least and second modulated carrier with the second encoded data and spectrally spread.

13 Claims, 1 Drawing Sheet

Figure 1:
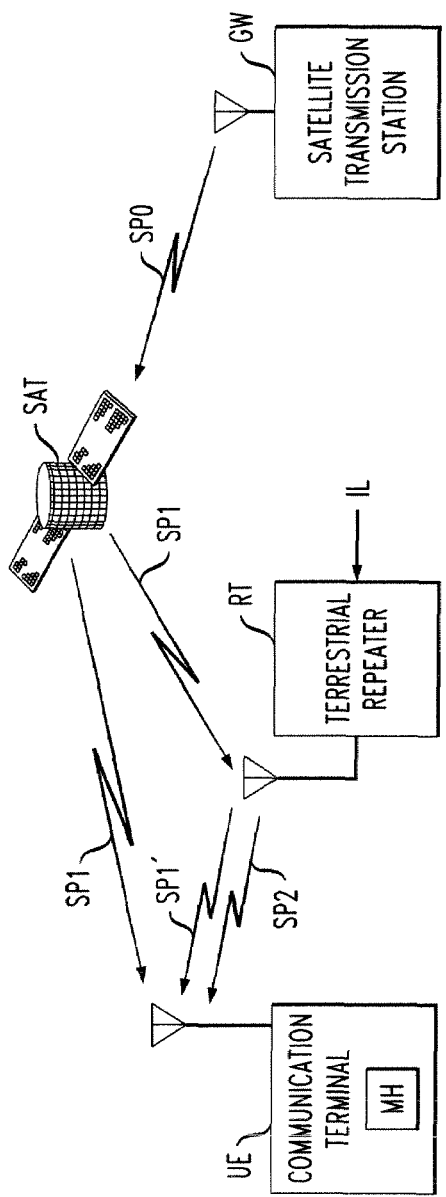

TERRESTRIAL REPEATER WITH REDISTRIBUTION OF PSEUDO-RANDOM CODES ON DIFFERENT CARRIER FREQUENCIES

The invention relates to the field of hybrid communication networks, and particularly those including a code division multiple access (CDMA) radio interface.

Here, "hybrid communication network" (or hybrid network) means a satellite communication network using a CDMA type radio interface, for example, including one or more terrestrial repeaters, certain of which may constitute base stations of a cellular radio network, for example of GSM/GPRS or UMTS type. One such hybrid network is an SDMB (Satellite Digital Multimedia Broadcast) type network, for example.

As the person skilled in the art is aware, in a CDMA type network the data to be transmitted is first encoded by means of sequences of mutually orthogonal pseudo-random codes (for example Walsh codes) each associated with a traffic or signaling channel (physical transmission channel) in the downlink direction (i.e. from the network toward the user terminals). These pseudo-random codes are also called channelization codes. The encoded data is then used to modulate carriers which, before being transmitted, are subject to spectrum spreading by means of so-called "scrambling" codes (for example Gold codes) each associated with a sequence of pseudo-random codes, and also called spreading codes. Sets of channelization codes associated with different spreading codes are no longer mutually orthogonal.

In theory, i.e. in the presence of single-path propagation (and more precisely a single-path propagation channel) of modulated carriers containing the encoded signals, and for each spreading code, there is no interference between channelization codes provided that the number of different (traffic and signaling) communication channels used does not exceed the number of channelization codes that may be used. This latter number is limited by the spreading factor. With a spreading factor L, the maximum number of channelization codes that may be used for each spreading code is equal to L. Consequently, in the presence of single-paths, each spreading code may support L channelization codes without interference.

However, in practice, propagation in a dense environment, for example an urban environment, or indoors, or for a hybrid system based on a satellite component and a network of terrestrial receivers, is rarely of single-path type, but rather of multi-path type, because of multiple reflections and diffractions. This signal propagation of multi-path type induces inter-path interference (i.e. a loss of the orthogonality of the channelization codes) at the level of the receivers of the user terminals, which limits the transmission capacity of the hybrid network. This loss of orthogonality increases in proportion to the number of echoes and the number of channelization codes.

At least two solutions have been proposed that attempt to improve upon this situation.

A first solution consists in distributing the channelization codes between different spreading codes at the level of the satellite. However, this cannot really reduce interference as the channelization codes are mutually orthogonal only if they are associated with a given spreading code.

A second solution would consist in using in the hybrid networks other air radio interfaces proposed for future 3G type networks, such as the HSDPA (currently undergoing standardization at the 3GPP level (this is the organization responsible for the standardization of terrestrial 3G networks)). This second solution, based on an HSDPA radio interface enabling dynamic adaptation of the modulation/coding scheme as a function of propagation conditions, cannot be used in hybrid broadcast networks, such as the SDMB system, because it requires a return channel (from the user terminal to the network) for this adaptation.

No known solution using the W-CDMA FDD type radio interface supported by 3G networks proving entirely satisfactory, an object of the invention is therefore to improve upon the situation.

To this end, it proposes a terrestrial repeater for a hybrid communication network, including at least one communication satellite for transmitting to communication terminals (and to the repeater(s) it covers) signals in the form of a first carrier modulated with principal data to be transmitted, encoded by means of initial sequences of at least two mutually orthogonal pseudo-random codes each associated with a physical transmission channel, and spread spectrally by means of spreading codes each associated with a sequence.

This terrestrial repeater is characterized in that it comprises:

first processor means for dispreading received signals and then demodulating them to recover the encoded principal data that they represent in order to decode it, and second processor means for re-encoding the recovered principal data, on the one hand, with a first portion of the codes of the corresponding sequence to constitute first encoded principal data and, on the other hand, with at least one second portion of the codes of the corresponding sequence, at least complementary to the first portion, to constitute at least second encoded principal data, and for generating for the terminals, on the one hand, first signals in the form of the first carrier modulated with the spectrally spread first encoded principal data and, on the other hand, at least second signals in the form of at least one second carrier modulated with the spectrally spread second encoded principal data.

The repeater according to the invention may have complementary features and particularly, separately or in combination:

the first processor means may be adapted to receive auxiliary data to be transmitted to the terminals. In this case, the second processor means are responsible for encoding the auxiliary data with the second portion of the codes of the corresponding sequence to constitute second encoded auxiliary data for modulating the second carrier, if the initial sequences include at least first, second and third pseudo-random codes, each first sequence may include a first pseudo-random code and a second or third pseudo-random code, and each second sequence may include at least one third and/or one second pseudo-random code, alternatively, if the initial sequences include first, second and third portions of pseudo-random codes, the second processor means may be responsible i) for re-encoding the recovered principal data, on the one hand, with the first portion of the codes of the corresponding sequence to constitute the first encoded principal data, secondly, with the second portion of the codes of the corresponding sequence, to constitute the second encoded principal data, and thirdly with the third portion of the codes of the corresponding sequence, to constitute the third encoded principal data, and ii) for generating for the terminals, on the one hand, the first and second signals and, on the other hand, the third signals in the form of a third carrier modulated with the spectrally spread third encoded principal data. In this case, if the initial sequences include at least first, second and third pseudo-random codes, each first sequence may include a first pseudo-random code, each second sequence may include at least one second pseudo-random code, and each third sequence may include at least one third pseudo-random code, the second portion of the sequence and/or the third portion of the sequence may include at least one complementary pseudo-random code, the second processor means may include carrier transmitter modules equal in number to the number of different carriers to be transmitted and respectively responsible for re-encoding the recovered first and second principal data, together with any auxiliary data, and for generating the first and second signals, and where applicable the third signals, allowing for signaling information. In this case, the first processor means are, for example, responsible for associating the signaling information with the principal and auxiliary data to be transmitted, allowing for the frequencies of the carriers that they must modulate once encoded, and then routing them to the carrier transmitter modules. The second processor means may also comprise respective power amplifiers installed downstream of the carrier transmitter modules and responsible for feeding a transmit antenna, the first processor means may include, on the one hand, a carrier receiver module responsible for despreading and demodulating the received signals and recovering the encoded principal data that they represent in order to decode it and, on the other hand, a baseband processor module fed with data to be re-encoded by the carrier receiver module and/or with auxiliary data and responsible for associating the signaling information with the principal and auxiliary data to be transmitted before routing them to the corresponding carrier transmitter modules, operation and maintenance control means responsible for managing the operation of at least some of the means that constitute the repeater and radio resource control means coupled to the operation and maintenance control means and to the baseband processor module and responsible for transmitting configuration and/or supervision control signals to the carrier transmitter modules, to the baseband processor module and to the carrier receiver module. In this case, the repeater may also comprise a modem for coupling the operation and maintenance control means and a management equipment of the hybrid network, clock means adapted to deliver clock signals to the first and second processor means to enable temporal synchronization thereof.

The terrestrial repeater according to the invention may constitute a base station of a radio communication network constituting a portion of the hybrid network provided that its clock means take the form of a GNSS type receiver delivering a time reference for said radio communication network and particularly for its various base stations.

The invention is particularly well adapted, although not exclusively so, to hybrid networks using a W-CDMA type radio interface.

Figure 2:
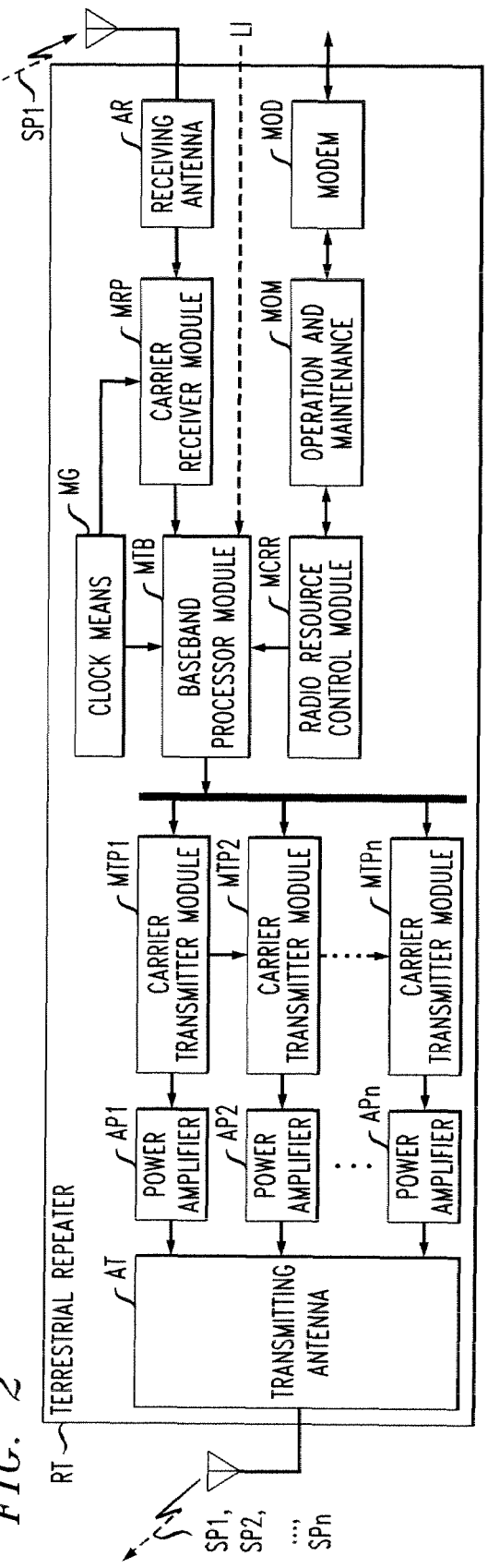

Other features and advantages of the invention will become apparent on examining the following detailed description and the appended drawings, in which:

FIG. 1 is a diagram of one embodiment of the invention linking a satellite station, a communication satellite, a terrestrial repeater and a communication terminal, and FIG. 2 is a functional diagram of one embodiment of a terrestrial repeater according to the invention.

The appended drawings may constitute part of the description of the invention as well as contributing to the definition of the invention, if necessary.

An object of the invention is to reduce inter-path interference and to increase capacity in a hybrid communication network including one or more communication satellites and one or more terrestrial repeaters.

It is considered hereinafter by way of illustrative example that the hybrid network is an SDMB (Satellite Digital Multimedia Broadcast) network using a W-CDMA type radio interface. However, the invention is not limited to this type of hybrid network alone. In fact, it relates to all hybrid networks in which data is transmitted by means of a carrier modulated with data encoded by means of sequences of mutually orthogonal pseudo-random codes each associated with a physical downlink transmission channel (i.e. from the network to the user terminals), and spread spectrally by means of spreading codes each associated with a sequence of pseudo-random codes. Thus the invention relates to hybrid networks in which the air (or radio) interface may be changed as a function of what is required, for example to change from a QPSK type interface to an 8PSK type interface. This procedure for changing the air interface is known as SDR (Software Defined Radio).

As indicated hereinabove and as shown diagrammatically in FIG. 1, a hybrid network includes at least one communication satellite SAT responsible for retransmitting to one or more terrestrial repeaters RT and to communication terminals (or user terminals) UE data received from a satellite transmission station (or gateway) GW of the network.

Here, "communication terminal" means any user equipment, such as a mobile or fixed telephone, a fixed or portable computer or a personal digital assistant (or PDA) equipped with radio communication means. It is considered hereinafter, by way of illustrative and nonlimiting example, that the communication terminals are mobile telephones.

Also, "terrestrial repeater" here means a network equipment responsible at least for receiving (modulated and spread) signals transmitted by a communication satellite SAT and retransmitting them by radio to user equipments UE. It is important to note that a terrestrial repeater RT may also have the function of a base station (BTS or node B) of a cellular radio network, for example of GSM/GPRS or UMTS type. It is considered hereinafter, by way of illustrative and nonlimiting example, that the terrestrial repeater RT does not have this kind of base station function.

As indicated hereinabove, the communication satellites SAT of a hybrid network using a W-CDMA type radio interface transmit signals representative of data intended for user equipments UE (here mobile telephones). Those signals (SP0) are transmitted to it by radio by a satellite station (or gateway) GW on the ground. More precisely, when data must be transmitted in a physical downlink transmission channel associated with a channelization code (or pseudo-random code), itself belonging to a sequence of mutual orthogonal channelization codes associated with a spreading code, the satellite station GW begins by encoding said data using the channelization code. It then modulates a (first) carrier frequency F0 with the encoded data and spectrally spreads this modulated carrier using the associated spreading code, before transmitting it by radio to the satellite SAT, in the form of the signals SP0 called "carrier frequency signals". On receiving these signals SP0, the satellite SAT transposes the frequency F0 of the carrier to a frequency F1 and retransmits by radio signals SP1 transposed in frequency to the user terminals UE and the terrestrial repeater(s) RT that it covers.

The terrestrial repeater RT according to the invention includes firstly, as shown in FIG. 2, a receive antenna AR for collecting the carrier frequency signals SP1 in order to deliver them to first processor means including in particular a carrier receiver module MRP coupled to a baseband processor module MTB.

The carrier receiver module MRP despreads the carrier frequency signals received by the receive antenna AR and then demodulates them to recover the encoded data that they represent (hereinafter called principal data), and finally decodes the encoded principal data. For this, it uses various spreading codes and various channelization codes constituting the sequences associated with the spreading codes.

In other words, the carrier receiver module MRP demultiplexes the physical transmission channels as a function of the associated codes in order to feed the baseband processor module MTB with principal data on the various physical transmission channels.

The baseband processor module MTB feeds with data to be re-encoded second processor means MTPi of the repeater RT (see below). More precisely, it re-associates signaling information with the principal data to be re-encoded so that said principal data can be retransmitted to the mobile telephones UE. This re-association is preferably effected by duplication of the signaling information associated with the principal data in the carrier frequency signals SP1 transmitted by the satellite SAT.

As shown in FIG. 2, it may also handle local insertion of auxiliary data LI into the streams of data to be transmitted to the mobile telephones UE. This auxiliary data LI is supplied by a dedicated equipment of the network, for example, over cables. This data is, for example, data relating to a particular service, possibly offered locally by one or more terrestrial repeaters RT. If auxiliary data must be transmitted to the mobile telephones UE, the baseband processor module MTB also associates it with signaling information so that it can reach its destination.

The operation of the baseband processor module MTB, and more precisely the association of the signaling information with the principal data (by duplication) and the auxiliary data LI, is preferably controlled by a radio resource control module MCRR of the terrestrial repeater RT. The latter uses for this purpose management functions of the type used by the radio network controllers (RNC) that cellular networks include for controlling their base stations. Of these functions, there may be cited, for example, the allocation and management of radio resources (spreading codes, channelization codes) to the baseband processor module MTB.

The radio resource control module MCRR is preferably connected to the other modules of the terrestrial repeater RT and to an operation and maintenance control module MOM, of the O&M (Operation and Maintenance) type, in order to interface it to said modules. This operation and maintenance control module MOM is in fact responsible for managing the operation of the terrestrial repeater RT, and more precisely for configuring and supervising the operation of its various modules, by means of control signals transmitted via the radio resource control module MCRR.

This operation and maintenance control module MOM is additionally coupled to a network management equipment (not shown), such as an operation and maintenance control center, for example via a modem MOD. It can therefore receive from the management equipment configuration and/ or supervision instructions and transmit alarms to it in the event of detection of a problem in the terrestrial repeater RT.

The coupling between the modem MOD and the management equipment may be provided either by cables or by radio, for example by means of a network management protocol, such as the Internet SNMP protocol (Simple Network Management Protocol).

The terrestrial repeater RT according to the invention includes second processor means MTPi responsible, firstly, for re-encoding the principal data that has been recovered and re-associated with the initial signaling information by the baseband processor module MTB, and where applicable for encoding the auxiliary data that has been communicated to said baseband processor module MTB and associated with the corresponding signaling information by the latter; secondly, for using the re-encoded principal data (and any encoded auxiliary data) to modulate at least two different carrier frequencies, including the first frequency F1; and, thirdly, to spread spectrally these various carrier frequencies.

The principal data, previously encoded by the satellite SAT by means of a first portion of the channelization codes of a given sequence associated with a given spreading code and multiplexed with other principal data by said satellite SAT by means of a second portion of the channelization codes of the same given sequence, complementary to the first, is re-encoded by means of the same first portion of the channelization codes in order to form first encoded principal data. The other principal data is re-encoded by means of at least the second portion of the channelization codes in order to form second encoded principal data.

The first encoded principal data is then used to modulate the first carrier, having the first frequency F1, after which this modulated first carrier is spread spectrally by means of the spreading code associated with the corresponding first portion of the channelization codes. Similarly, the second encoded principal data is used to modulate the second carrier, having a second frequency F2, after which this modulated second carrier is spread spectrally by means of the same spreading code (also associated with the corresponding second portion of the channelization codes).

For example, if a sequence, initially used by the satellite SAT with a given spreading code, includes three channelization codes C1, C2 and C3 (for example associated with three physical transmission channels authorizing bit rates of 384 kbps), the first portion of the sequence may consist of the first code C1 and the second code C2 (or the first code C1 and the third code C3), whereas the second portion of the sequence may consist of the third code C3 (or the second code C2) as well as, where applicable, at least one complementary channelization code (C4) also associated with the given spreading code.

In this case, the first encoded principal data is the result of encoding principal data by means of the first code C1 and the second code C2 (or the first code C1 and the third code C3), and the second encoded principal data is the result of encoding principal data by means of the third code C3 (or the second code C2) as well as, where applicable, at least one complementary channelization code (C4). The spectral spreading is then effected, after the modulation phase, by means of an (identical or different) spreading code for the two carriers with different frequencies F1 and F2.

It is important to note that more than two carriers with different frequencies may be used, including the first (and initial) frequency F1. For example, three carriers may be used having three different frequencies F1, F2 and F3, or even more carriers, modulated by means of first, second and at least third encoded data.

For example, if a sequence, initially used by the satellite SAT with a given spreading code, includes three channelization codes C1, C2 and C3, and the terrestrial repeater RT is adapted to transmit first, second and third signals in the form of first, second and third carriers having the first frequency F1, the second frequency F2 and the third frequency F3, the first portion of the sequence may consist of the first code C1, the second portion of the sequence may consist of the second code C2 as well as, where applicable, at least one complementary channelization code (C4) also associated with the given spreading code, and the third portion of the sequence may consist of the third code C3 as well as, where applicable, at least one complementary channelization code (C5 and/or C4) also associated with said given spreading code.

In this case, the first encoded principal data is the result of encoding principal data by means of the first code C1, the second encoded principal data is the result of encoding principal data by means of the second code C2 (as well as, where applicable, at least one complementary channelization code (C4)), and the third encoded principal data is the result of encoding principal data by means of the third code C3 (as well as, where applicable, at least one complementary channelization code (C5 and/or C4)). The spectral spreading is then effected, after the modulation phase, by means of an (identical or different) spreading code for the three carriers with different frequencies F1, F2 and F3.

The frequencies used, other than the first frequency F1 already used by the satellite SAT, are preferably frequencies used by the same satellite SAT or by other satellites of the same hybrid network to transmit carrier frequency signals in other zones (or spots) attached to other terrestrial repeaters RT. This is not obligatory, however.

When the baseband processor module MTB receives auxiliary data IL, it associates signaling information with it and communicates them together to the second processor means MTPi. This auxiliary data is preferably encoded with the second (or the third, or more generally an $n^{th}$ ($n \neq 1$)) portion of the channeling codes of the sequence, and/or with a complementary channelization code, which is associated with the spreading code used for spectrally spreading the $n^{th}$ carrier that it modulates.

It is important to note that an $n^{th}$ ($n \neq 1$) part does not necessarily include at least a portion of the channelization codes of a sequence initially used. The only condition to be respected by this $n^{th}$ portion is its association with the spreading code used to spread spectrally the $n^{th}$ carrier modulated by the $n^{th}$ data that they encode.

In order to re-encode the principal data (and where applicable to encode the auxiliary data), the second processor means preferably include as many carrier transmitter modules MTPi as there are carriers with different frequencies to be transmitted to the mobile telephones UE. For example, in the presence of two carriers with respective frequencies F1 and F2, two carrier transmitter modules MTP1 and MTP2 are used, whereas in the presence of three carriers with respective frequencies F1, F2 and F3, three carrier transmitter modules MTP1, MTP2 and MTP3 are used. In other words, in the presence of n carriers with respective frequencies F1, F2, . . . , Fn, n carrier transmitter modules MTP1, MTP2, . . . , MTPn are used.

Each carrier transmitter module MTPi is therefore responsible firstly either for re-encoding the $i^{th}$ principal data recovered (and the associated signaling information) with the $i^{th}$ portion of the sequence initially used by the satellite SAT to encode it, or for encoding any auxiliary data (and the associated signaling information) with the $i^{th}$ portion of the sequence initially used by the satellite SAT to encode it (or with at least one complementary code). Each carrier transmitter module MTPi then modulates the $i^{th}$ carrier with frequency Fi with the $i^{th}$ encoded data, and then spreads that carrier spectrally with the spreading code associated with the $i^{th}$ portion of code used. This $i^{th}$ carrier is then communicated to a transmit antenna AT in order for it to transmit it by radio in the form of $i^{th}$ signals SPi (SP1, SP2, . . . , SPn) to mobile telephones UE.

As shown in FIG. 2, a power amplifier APi is preferably provided downstream of each carrier transmitter module MTPi and upstream of the transmit antenna AT, in order to obtain the output level necessary for the expected radio coverage.

The baseband processor module MTB is coupled to each carrier transmitter module MTPi via a bus, for example. It is therefore also responsible for switching the principal and auxiliary data (and the associated signaling information), that uses (or should use) a physical transmission channel, to the carrier transmitter module MTPi that is responsible for the (re-)encoding by means of the channelization code corresponding to this physical transmission channel.

Moreover, the terrestrial repeater RT preferably includes clock means MG responsible for delivering identical clock signals at least to the carrier receiver module MRP and to each of the carrier transmitter modules MTPi, as well as to the baseband transmission module MTB in order to supply it with a selected time reference.

The clock means MG preferably take the form of a GNSS receiver fed with signals defining the time reference of a satellite positioning network (or GNSS network), for example a GPS (Global Positioning System) network. Note that the signals defining the time reference do not necessarily come directly from the satellites of the GNSS network; they may come from terrestrial relay stations.

The carrier receiver module MRP, the carrier transmitter modules MTPi, the baseband processor module MTB, the radio resource control module MCRR and the operation and maintenance control module MOM may take the form of electronic circuits, software (or electronic data processing) modules, or a combination of circuits and software.

Thanks to the invention, neither the user equipments UE nor the communication satellites SAT of the hybrid network need to be modified.

In the presence of the invention, the user equipments UE may continue to use intercellular call transfer (or handover) functions.

More precisely, for the channelization codes of the first portion, used both by the carrier SP1 of the satellite SAT and by the carrier SP1' of the terrestrial repeater RT, which have the same first frequency F1, the user equipments UE effect so-called "soft" or "softer" handover procedures on the principal data encoded with the channelization codes of the first code portion (for example C1 and C2) by means of their so-called "rake" receiver using a maximum ratio combination technique, for example.

For the channelization codes of the other code portions, used only by the carrier(s) SPn ($n \neq 1$) of the terrestrial repeater RT having a frequency (or frequencies) Fn different from the first frequency F1, the user equipments UE effect so-called "hard" handover procedures both on the principal data encoded by means of the channelization codes of the $n^{th}$ code portions (for example C3 and C4) and on the principal data encoded by means of the channelization codes of the first code portion (for example C1 and C2). These hard handovers are defined in particular in 3GPP specifications (3GPP 25.303, section 647, and 3GPP 25.331, section 835).

For the auxiliary data LI, the user equipments UE effect soft or softer intracellular and intercellular handover procedures vis-à-vis terrestrial repeaters RT that deliver them in parallel.

Thanks to the invention, the broadcasting capacities of the hybrid network may be significantly enhanced. Furthermore, the invention offers flexibility in terms of radio resource allocation. It also enables the insertion of auxiliary data dedicated to specific local services.

The invention is not limited to the terrestrial receiver embodiments described hereinabove by way of example only, but encompasses all variants that the person skilled in the art might envisage that fall within the scope of the following claims.

The invention claimed is:

1. A terrestrial repeater (RT) for a hybrid communication network, including at least one communication satellite (SAT) adapted to transmit to communication terminals (UE) and at least to said repeater signals in the form of a first carrier modulated with principal data to be transmitted, encoded by means of initial sequences of at least two mutually orthogonal pseudo-random codes each associated with a physical transmission channel, and spread spectrally by means of spreading codes each associated with a sequence, the terrestrial repeater comprising i) first processor means (MRP, MTB) adapted, on reception of said signals, to despread said signals and to demodulate said signals to recover the encoded principal data that said signals represent in order to decode said principal data, and ii) second processor means (MTPi, API) adapted to re-encode said recovered principal data with a first portion of the codes of said corresponding sequence to constitute first encoded principal data and, with at least one second portion of the codes of said corresponding sequence, at least complementary to said first portion, to constitute at least second encoded principal data, and to generate for said terminals (UE), first signals in the form of said first carrier modulated with said spectrally spread first encoded principal data and, at least second signals in the form of at least one second carrier modulated with said spectrally spread second encoded principal data.

2. The repeater according to claim 1, wherein said first processor means (MRP, MTB) are adapted to receive auxiliary data (LI) to be transmitted to said terminals (UE) and in that second processor means (MTPi, APi) are adapted to encode said auxiliary data (LI) with said second portion of the codes of said corresponding sequence to constitute second encoded auxiliary data for modulating said second carrier.

3. The repeater according to claim 1, wherein said initial sequences include at least first, second and third pseudo-random codes, each first sequence includes a first pseudo-random code and a second or third pseudorandom code, and each second sequence includes at least one third or one second pseudo-random code.

4. The repeater according to claim 1, wherein said initial sequences include first, second and third portions of pseudo-random codes, said second processor means (MTPi, APi) are adapted to re-encode said recovered principal data with said first portion of the codes of said corresponding sequence to constitute said first encoded principal data, secondly, with said second portion of the codes of said corresponding sequence, to constitute said second encoded principal data, and thirdly with said third portion of the codes of said corresponding sequence, to constitute third encoded principal data, and to generate for said terminals (UE) said first and second signals and third signals in the form of a third carrier modulated with said spectrally spread third encoded principal data.

5. The repeater according to claim 4, wherein said initial sequences include at least first, second and third pseudo-random codes, each first sequence includes a first pseudo-random code, each second sequence includes at least one second pseudo-random code, and each third sequence includes at least one third pseudo-random code.

6. The repeater according to claim 1, wherein said second portion of the sequence and/or said third portion of the sequence include(s) at least one complementary pseudo-random code.

7. The repeater according to claim 1, wherein said second processor means (MTPi, APi) include carrier transmitter modules (MTPi) equal in number to the number of different carriers to be transmitted and respectively responsible for re-encoding the recovered first and second principal data, together with any auxiliary data, and for generating said first and second signals, and where applicable said third signals, allowing for signaling information, and in that said first processor means (MRP, MTB) are adapted to associate said signaling information with the principal and auxiliary data to be transmitted, allowing for the frequencies of the carriers that they must modulate once encoded, and then to route them to said corresponding carrier transmitter modules (MTPi).

8. The repeater according to claim 7, wherein said second processor means (MTPi, APi) comprise respective power amplifiers (APi) installed downstream of said carrier transmitter modules (MTPi) and feeding a transmit antenna (AT).

9. The repeater according to claim 7, wherein said first processor means (MRP, MTB) include a carrier receiver module (MRP) adapted to despread and to demodulate said received signals and to recover said encoded principal data that they represent in order to decode it and a baseband processor module (MTB) fed with data to be re-encoded by said carrier receiver module and/or with auxiliary data and adapted to associate said signaling information with the principal and auxiliary data to be transmitted before routing them to said corresponding carrier transmitter modules (MTPi).

10. The repeater according to claim 9, further comprising operation and maintenance control means (MOM) adapted to manage the operation of at least some of the means that constitute it and radio resource control means (MCRR) coupled to said operation and maintenance control means (MOM) and to said baseband processor module (MTB) and adapted to transmit configuration and/or supervision control signals to said carrier transmitter modules (MTPi), to said baseband processor module (MTB) and to said carrier receiver module (MRP).

11. The repeater according to claim 10, further comprising a modem (MOD) for coupling said operation and maintenance control means (MOM) and a management equipment of said hybrid network.

12. The repeater according to claim 1, further comprising clock means (MG) adapted to deliver clock signals to said first processor means (MRP, MTB) and to at least some of said second processor means (MTPi) with a view to synchronizing them temporally.

13. The repeater according to claim 1, wherein said repeater constitutes a base station of a radio communication network constituting a portion of said hybrid network.

* * * * *